US012202181B2

(12) United States Patent
Brinkmeier et al.

(10) Patent No.: US 12,202,181 B2
(45) Date of Patent: Jan. 21, 2025

(54) METHOD FOR INJECTION MOLDING A LIGHT MODULE FOR A LIGHTING DEVICE OF A MOTOR VEHICLE

(71) Applicant: HELLA GmbH & Co. KGaA, Lippstadt (DE)

(72) Inventors: Frank Brinkmeier, Lippstadt (DE); Michael Lakenbrink, Oelde (DE); Ulrich Temme, Lippstadt (DE); Thomas Wiese, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 130 days.

(21) Appl. No.: 17/970,683

(22) Filed: Oct. 21, 2022

(65) Prior Publication Data
US 2023/0043893 A1   Feb. 9, 2023

Related U.S. Application Data

(63) Continuation of application No. PCT/EP2021/059775, filed on Apr. 15, 2021.

(30) Foreign Application Priority Data

Apr. 22, 2020   (DE) .................. 10 2020 110 914.8

(51) Int. Cl.
*B29C 45/14*   (2006.01)
*F21S 41/29*   (2018.01)
(Continued)

(52) U.S. Cl.
CPC ........ *B29C 45/14467* (2013.01); *F21S 41/29* (2018.01); *B29C 2045/1454* (2013.01);
(Continued)

(58) Field of Classification Search
CPC .............. B60Q 1/04; B29L 2011/0083; B29L 2031/747; B29L 2031/30; F21W 2107/10;
(Continued)

(56) References Cited

U.S. PATENT DOCUMENTS 1,487,720 A * 3/1924 Christensen .......... F21S 41/321
362/516
5,626,413 A * 5/1997 Ferrell .................... F21S 45/50
362/267
(Continued)

FOREIGN PATENT DOCUMENTS

DE   19728445 C1   1/1999
DE   20203773 U1   6/2002
(Continued)

OTHER PUBLICATIONS

Search English translation of FR-2630526-A1 (Year: 1989).*
(Continued)

*Primary Examiner* — Omar Rojas Cadima
(74) *Attorney, Agent, or Firm* — Muncy, Geissler, Olds & Lowe, P.C.

(57) ABSTRACT

A method for producing a light module for a lighting device of a motor vehicle, wherein the module comprises a support component and a light-outcoupling component. According to the invention, a connection element for establishing a retaining connection between the support component and the light-outcoupling component is molded at least onto the support component by means of an injection molding process.

17 Claims, 3 Drawing Sheets

(51) Int. Cl.
*B29K 101/12* (2006.01)
*B29K 701/12* (2006.01)
*B29K 705/02* (2006.01)
*B29L 31/30* (2006.01)

(52) U.S. Cl.
CPC ...... *B29K 2101/12* (2013.01); *B29K 2701/12* (2013.01); *B29K 2705/02* (2013.01); *B29L 2031/30* (2013.01)

(58) Field of Classification Search
CPC ...... F21W 2104/00; B29C 2045/14459; B29C 45/14467; B29C 2045/14319; B29C 2045/1668; B29C 45/0062; B29C 45/1657; F21S 41/29; F21S 41/295; F21S 45/50; F21V 31/005; F21V 15/01; F21V 17/101
See application file for complete search history.

(56) References Cited

U.S. PATENT DOCUMENTS

| | | | |
|---|---|---|---|
| 11,104,083 B2 | 8/2021 | Schuette | |
| 2005/0117362 A1 | 6/2005 | Yamada et al. | |
| 2009/0231872 A1 | 9/2009 | Mesko et al. | |
| 2013/0242587 A1 | 9/2013 | Hirabayashi et al. | |
| 2015/0306801 A1 | 10/2015 | Ito et al. | |
| 2016/0363284 A1 | 12/2016 | Colombel et al. | |
| 2017/0074479 A1 | 3/2017 | Kohata et al. | |

FOREIGN PATENT DOCUMENTS

| | | | |
|---|---|---|---|
| DE | 102010024169 A1 | 12/2011 | |
| DE | 102016123203 A1 | 6/2018 | |
| DE | 202018106141 U1 | 1/2020 | |
| EP | 3104066 A1 | 12/2016 | |
| FR | 2630526 A1 * | 10/1989 | |
| KR | 20120029939 A | 3/2012 | |
| KR | 20120107719 A | 10/2012 | |
| WO | WO-2017017324 A1 * | 2/2017 | ............ F21S 41/255 |
| WO | WO2018041707 A1 | 3/2018 | |

OTHER PUBLICATIONS

Search English translation of WO 2017017324 A1 (Year: 2017).*
International Search Report dated May 14, 2021 in corresponding application PCT/EP2021/057057.

* cited by examiner

METHOD FOR INJECTION MOLDING A LIGHT MODULE FOR A LIGHTING DEVICE OF A MOTOR VEHICLE

This nonprovisional application is a continuation of International Application No. PCT/EP2021/059775, which was filed on Apr. 15, 2021, and which claims priority to German Patent Application No. 10 2020 110 914.8, which was filed in Germany on Apr. 22, 2020, and which are both herein incorporated by reference.

BACKGROUND OF THE INVENTION

Field of the Invention

The present invention relates to a method for producing a light module for a lighting device of a motor vehicle, wherein the module comprises a metallic support component and a light-outcoupling component.

Description of the Background Art

Light modules for light-outcoupling in automotive lighting devices usually comprise a support component, in particular in the form of a frame, and a light-outcoupling component received therein, such as a lens or a lens array or a light guide element. In the case of modules for light-outcoupling, a retaining connection between the light-outcoupling component and the support component is usually established by gluing or laser welding in the prior art. In the case of glued modules, the support component is preferably made of metal or thermoset plastic materials; for laser-welded modules, thermoplastics are otherwise used, which, however, have poorer thermo-mechanical properties as compared to metals or many thermoset materials. The light-outcoupling component is usually made of a transparent thermoplastic. A major procedural challenge in the design of a modern automotive lighting device, especially in the case of a headlight, is the precise alignment of all light modules, such as light source, reflector, light guidance and light-outcoupling, to each other and in relation to a vehicle-fixed holding device. Due to manufacturing tolerances of the individual components as well as the tolerances when joining the individual components into modules, a long tolerance chain is created, so that very often no direct referencing on the light source is possible when assembling the various modules. In the prior art, therefore, a portion of the connection and assembly steps is carried out under active alignment, which means that the generated light impression of the lighting device is observed in situ on a projection surface and optimized as specified during adjustment of the components or modules. Such a sequential, complex assembly and adjustment process is disadvantageously lengthy and associated with high use of personnel and investments in assembly equipment.

SUMMARY OF THE INVENTION

It is therefore an object of the present invention to provide a method for producing a light module for a lighting device of a motor vehicle, by means of which a light module of high tolerance quality and in particular with a low-tolerance connection between a support component and a light-outcoupling component can be produced.

The invention comprises the technical teaching that a connection element for establishing a retaining connection between the support component and the light-outcoupling component is molded by means of an injection molding process at least onto the support component.

The invention is based on the idea of replacing the adhesive or laser welding process commonly used in the prior art for joining support component and light-outcoupling component with an injection molding process much lower in tolerance. This makes it possible to dispense with a separate adjustment step when setting up the module, in which, if necessary, even under lighting, an active alignment of the light-outcoupling component to the support component takes place. Rather, the high precision of injection molding ensures a target positioning of the two components to each other, which is fixed by the molded connection element forming a retaining connection.

In a first example of the method according to the invention, the support component and the light-outcoupling component can be provided and inserted into an injection mold, wherein the connection element is then molded onto the support component and onto the light-outcoupling component forming the retaining connection. The two components to be joined are provided individually, the support component, for example, as a functionally shaped metallic sheet metal part and the light-outcoupling component made of glass or in particular of a transparent plastic and are received in the injection mold in their relative target positioning. The injection molding results in a retaining connection of the two components by means of the molded connection element, which in particular establishes form-fitting connections to the two components.

In another example, only the support component may be provided and inserted into an injection mold, wherein the connection element is then molded onto the support component forming the retaining connection, and wherein the light-outcoupling component is injected as a section of the connection element. In this case, the light-outcoupling component is therefore only produced in the course of injection molding as an injection molded component, namely in particular together with the connection element and as a section of the same. The connection element and the light-outcoupling component are preferably single-piece and integrally formed.

The injection molding of the connection element and/or the light-outcoupling component can be carried out in one cycle or in several cycles. For example, it may be necessary to perform at least two spray cycles if the light-outcoupling component is a thick-walled lens with high demands on optical quality.

The support component and/or the light-outcoupling component can each be provided with at least one connecting section, wherein the connecting sections are overmolded by the connection element forming the retaining connection forming a form fit. Preferably, the retaining connection of the two components is to be provided near the lighting primary function, i.e., near the light-outcoupling, in order to keep relative changes in the position of the components that may occur in the event of thermal expansion when operating the lighting device small by using very short levers. The connecting section on the light-outcoupling component can be formed, for example, as a circumferential collar.

With particular advantage, the connecting sections of the support component and/or the light-outcoupling component are provided with at least one undercut and/or with at least one opening. This serves the formation of form-fitting connections to the molded connection element. Particularly when using a metallic support component, this is necessary to ensure a resilient and durable connection with the connection element molded from a plastic. For example, undercut microstructures can be created on the metal surface of the support component by means of laser processing, electro-chemical, wet-chemical or mechanical treatment.

Furthermore, it is advantageous that accompanying the injection molding of the connection element, at least one reference element for referencing on the lighting device is molded onto the module. Due to the high precision and reproducibility of the injection molding process, a high tolerance quality of the assembly to the references of a component to be contacted, for example to a support frame of the lighting device, can be generated. In particular, this opens up the possibility of direct referencing on the light-outcoupling module to the light source, whereby the time-consuming process of active alignment of the assemblies to each other can be avoided.

For example, the support component can be provided with at least one hole, wherein the hole is overmolded to form the reference element. The remaining opening is precisely defined in diameter and position and is suitable, for example, for holding screws or pins. Alternatively, or additionally, a reference element can be molded in the form of a cone.

The light-outcoupling component can be provided or molded in the form of a lens.

In addition, the connection element can be injected in a further advantageous embodiment with at least one cladding section, wherein the cladding section envelops the support component at least in sections. As a result, the connection element fulfills an additional design function and hides such sections of the, in particular, metallic support component, which are visible from outside the provided lighting device. In particular, a desired color impression can be achieved by choosing a colored plastic. Preferably, the cladding section comprises no additional form-fitting joints with the support component in order to decouple the respective thermal expansion movements from each other as far as possible.

Furthermore, the invention relates to a light module for a lighting device of a motor vehicle, wherein the module comprises a support component and a light-outcoupling component, and wherein the module is produced by means of the method according to the invention in one of the aforementioned embodiments.

The support component of the module can comprise a metal and/or a metal alloy. Compared to plastics, metals are characterized by their superior mechanical and thermo-mechanical properties. When carrying out the method according to the invention, a retaining connection between the metallic support component and the light-outcoupling component is ensured by means of the connection element under form-fit formation. In particular, the support component may advantageously comprise an aluminum alloy, for example, an aluminum-magnesium alloy. Aluminum alloys are characterized by a low specific gravity as well as a low coefficient of thermal expansion.

With further advantage, the connection element and/or the light-outcoupling component comprise a thermoplastic. Thermoplastics are cost-effective, easy to spray and their transparent nature is suitable for optical applications. Preferably, the connection element and/or the light-outcoupling component comprise a polycarbonate and/or a polymethyl methacrylate.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
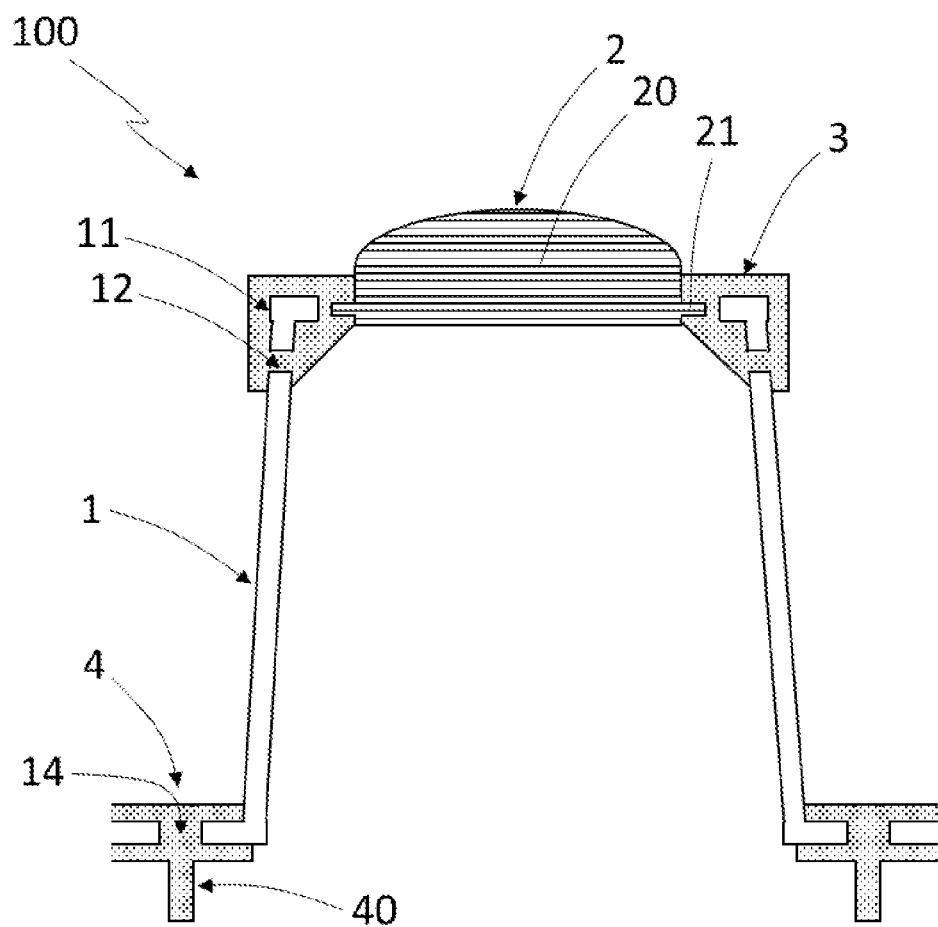
FIG. 1a shows a cross-sectional view of a first module according to the invention.
Figure 1B:
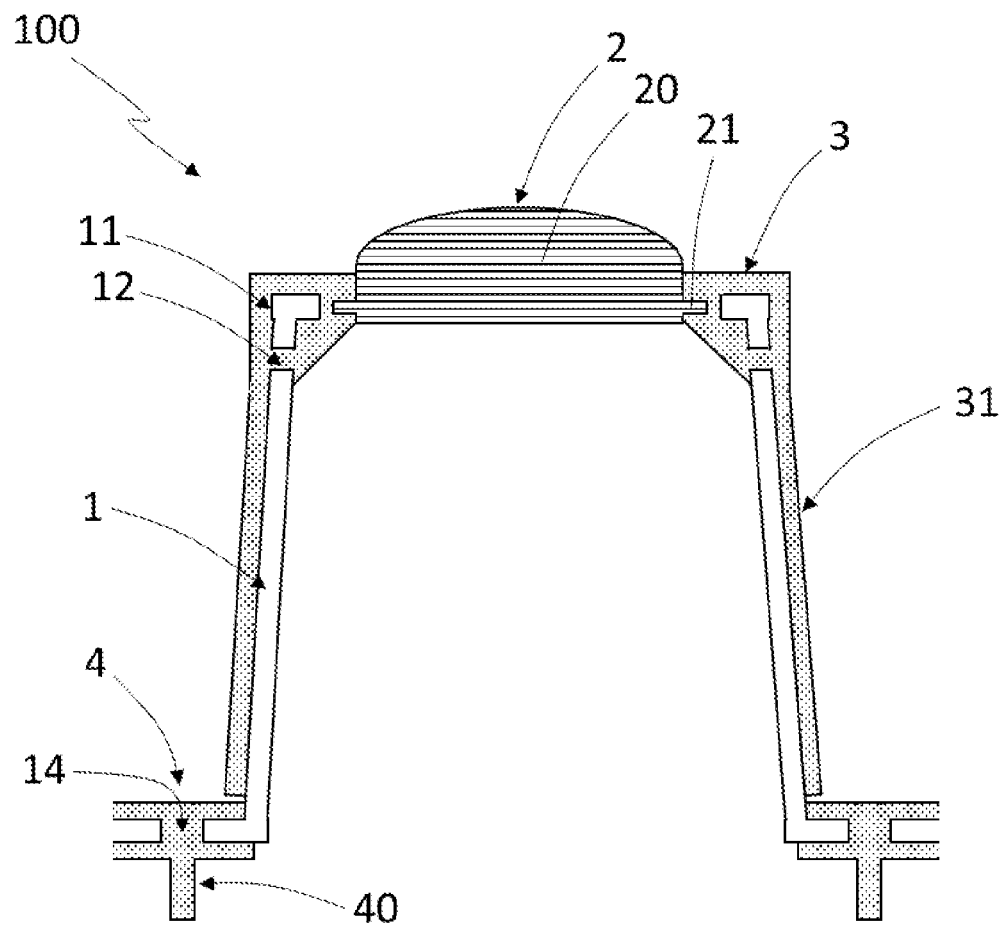
FIG. 1b shows a cross-sectional view of a second module according to the invention
Figure 2:
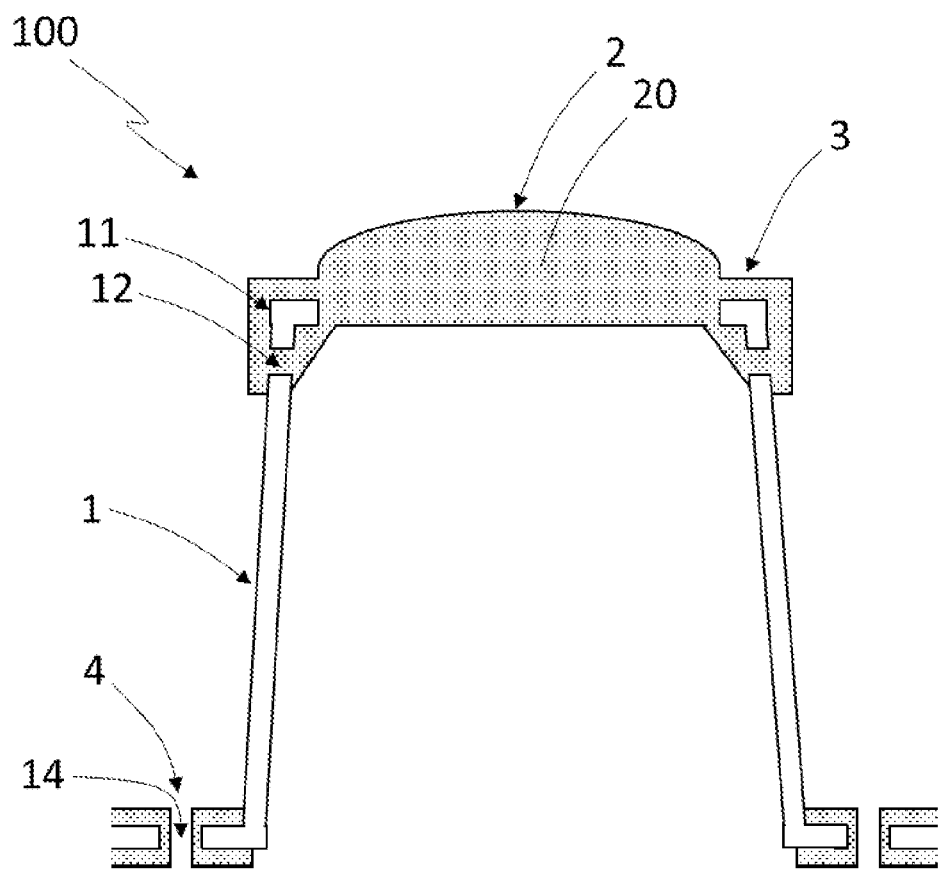
FIG. 2 shows a cross-sectional view of a third module according to the invention.

FIGS. 1a, 1b and 2 show cross-sectional views of three different embodiments of the light module 100 according to the invention. The module 100 comprises the support component 1 with the connection element 3 molded at the connecting section 11, which forms the retaining connection between the support component 1 and the light-outcoupling component 2. The three-dimensional shape of the support component 1 is essentially rotationally symmetrical about the longitudinal axis and the light-outcoupling component is formed as a lens 20 in each case. The support component 1 is preferably made of a light aluminum alloy.

The modules 100 shown in FIGS. 1a and 1b have been produced according to an embodiment of the method according to the invention, in which both the support component 1 and the light-outcoupling component 2 are provided as prefabricated components and inserted into the injection mold used in a target positioning to each other. In the subsequent injection molding process, the connection element 3, for example made of a thermoplastic, is then molded between the support component 1 and the light-outcoupling component 2 to produce the retaining connection.

The connection element 3 forms form-fitting connections with the respective connecting sections 11, 21. The connecting section 11 extends, in particular in full, along the final section of the support component 1 shown in the figures above and comprises circumferentially spaced openings 12, which are positively overmolded by the connection element 3. In addition, or alternatively, the surface of the connecting section 11 may be at least partially provided with undercut surface structures to further strengthen the connection between the support component 1 and the connection element 3. On the side of the light-outcoupling component 2, the connecting section 21 is formed as a, for example, fully circumferential collar for the formation of a spring-groove connection with the connection element 3. The light-outcoupling component 2 is formed, for example, from an optical glass, but usually from a transparent thermoplastic, wherein the connection element 3 is preferably formed from the same plastic to optimize the thermo-mechanical properties of the compound.

In the embodiment of module 100 shown in FIG. 1b, the connection element 3 additionally comprises the cladding section 31, which fulfills a design function of the connection element 3 as an external cover of the support component 1. This may serve in particular to achieve a certain color impression by using a suitably colored plastic for producing the connection element 3 and is expedient if the support component 1 is visible from the outside in the provided lighting device. Preferably, no form-fitting connection is established between the support component 1 and the cladding section 31, so that no undesirable interactions in the course of thermal expansion can occur.

The module 100 shown in FIG. 2 has been produced according to a second variant of the method according to the invention, in which only the support component 1 is provided as a prefabricated component and inserted into the injection mold used. Only during subsequent injection molding is the light-outcoupling component 2 formed as a section of the connection element 3, wherein the connection element 3 forms a form-fitting, retaining connection of the aforementioned type with the support component 1. The light-outcoupling component 2 is formed here material-uniformly with the remaining connection element 3 and can be molded depending on the thickness of the lens 20 or depending on the required optical quality in one or more cycles. In multi-stroke injection molding, for example, a punch that can be moved in the injection mold can be used.

All modules shown in the three figures comprise reference elements 4, which are used for referencing on the lighting device and are molded onto the support component 1 accompanying the injection molding of the connection element 3. For this purpose, the support component 1 with the holes 14 is provided, and these are either dimensionally overmolded as shown in FIG. 2 under formation of the reference elements 4 or used as shown in FIGS. 1a and 1b for molding a cone 40. The reference elements 4 are used in the assembly process of module 100 in the associated lighting device for referencing, for example on a support frame or directly at the light source.

Due to the precision and reproducibility of the injection molding process used both for establishing the retaining connection between the support component 1 and the light-outcoupling component 2 and for the molding of the reference elements 4, the light modules according to the invention 100 have a high tolerance quality and thus enable a significant simplification of the assembly and adjustment process in the construction of the associated automotive lighting device.

The invention is not limited in its embodiments to the preferred embodiment given above. Rather, a number of variants is conceivable, which makes use of the presented solution even with fundamentally different designs. All features and/or advantages resulting from the claims, the description or the drawings, including constructive details, spatial arrangements and method steps, can be essential both by themselves and in the most diverse combinations of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a light module for a lighting device of a motor vehicle, the method comprising:
   providing the light module with a support component and a light-outcoupling component; and
   injection molding a connection element onto at least the support component by an injection-molding process to establish a retaining connection between the support component and the light-outcoupling component,
   wherein the connection element is molded with at least one cladding section, and
   wherein the connection element and the at least one cladding section of the connection element directly contact and envelop a majority of outer surfaces of the support component so as to form an outer cover of the support component.

2. The method according to claim 1, wherein the support component and the light-outcoupling component are provided and inserted into an injection mold, and wherein the connection element is subsequently molded onto the support component and onto the light-outcoupling component forming the retaining connection.

3. The method according to claim 1, wherein the light-outcoupling component is provided or molded in the form of a lens.

4. The method according to claim 1, wherein the support element is cylindrical-shaped with a circumferential outer wall that is directly contacted by and enveloped by the at least one cladding section.

5. The method according to claim 1, wherein the support component and/or the light-decoupling component are each provided with at least one connecting section, and wherein the connection element is molded at the at least one connecting section of the support component and/or the light-decoupling component to provide a form fit.

6. The method according to claim 5, wherein the at least one connecting section of the support component is provided with at least one undercut and/or with at least one opening.

7. The method according to claim 1, wherein, accompanying the injection molding of the connection element, at least one reference element is injection molded onto the light module for reference to the lighting device.

8. The method according to claim 7, wherein the support component is provided with at least one hole, and wherein the at least one hole is overmolded to form the reference element.

9. The method according to claim 7, wherein the reference element is molded in the form of a cone.

10. A light module for a lighting device of a motor vehicle, the light module comprising:
    a support component;
    a light-outcoupling component; and
    a connection element that provides a retaining connection between the support component and the light-outcoupling component,
    wherein the light module is produced by the method according to claim 1, and
    wherein the connection element has at least one cladding section, the connection element and the at least one cladding section of the connection element directly contacting and enveloping a majority of outer surfaces of the support component so as to form an outer cover of the support component.

11. The light module according to claim 10, wherein the support component comprises a metal and/or a metal alloy.

12. The light module according to claim 10, wherein the support component comprises an aluminum alloy.

13. The light module according to claim 10, wherein the connection element and/or the light-outcoupling component comprise a thermoplastic material.

14. The light module according to claim 10, wherein the connection element and/or the light-outcoupling component comprise a polycarbonate and/or a polymethyl methacrylate.

15. The light module according to claim 10, wherein the support element is cylindrical-shaped with a circumferential outer wall that is directly contacted by and enveloped by the at least one cladding section.

16. A method for producing a light module for a lighting device of a motor vehicle, the method comprising:
   providing the light module with a support component and a light-outcoupling component; and
   injection molding a connection element onto at least the support component by an injection-molding process to establish a retaining connection between the support component and the light-outcoupling component,
   wherein the support component is provided and inserted into an injection mold, wherein the connection element is subsequently molded onto the support component forming the retaining connection, and wherein the light-outcoupling component is molded as a section of the connection element, with the light-outcoupling component being formed of a same thermoplastic material as the connection element, such that the light-outcoupling component and the connection element are monolithic.

17. The method according to claim 16, wherein the injection molding of the connection element and/or the light-outcoupling component is carried out in one cycle or in several cycles.

* * * * *